US012237130B2

(12) United States Patent
Harimochi et al.

(10) Patent No.: US 12,237,130 B2
(45) Date of Patent: Feb. 25, 2025

(54) ELECTROMAGNETIC RELAY INCLUDING MOVABLE MEMBER THAT MOVES INTEGRALLY WITH MOVABLE CONTACT PIECE

(71) Applicant: OMRON Corporation, Kyoto (JP)

(72) Inventors: Hiroyuki Harimochi, Kyoto (JP); Ryota Minowa, Kyoto (JP); Takeshi Nishida, Kyoto (JP); Hiroyuki Iwasaka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 172 days.

(21) Appl. No.: 18/011,504

(22) PCT Filed: Jun. 16, 2021

(86) PCT No.: PCT/JP2021/022855
§ 371 (c)(1),
(2) Date: Dec. 19, 2022

(87) PCT Pub. No.: WO2022/009629
PCT Pub. Date: Jan. 13, 2022

(65) Prior Publication Data

US 2023/0282434 A1 Sep. 7, 2023

(30) Foreign Application Priority Data

Jul. 6, 2020 (JP) ................................ 2020-116254

(51) Int. Cl.
*H01H 50/58* (2006.01)
*H01H 50/18* (2006.01)
*H01H 50/36* (2006.01)

(52) U.S. Cl.
CPC ........... *H01H 50/58* (2013.01); *H01H 50/18* (2013.01); *H01H 50/36* (2013.01)

(58) Field of Classification Search
None
See application file for complete search history.

(56) References Cited

U.S. PATENT DOCUMENTS

2022/0293381 A1* 9/2022 Nishida .................. H01H 50/14

FOREIGN PATENT DOCUMENTS

DE 202013006784 U1 11/2013
JP 6-309980 A 11/1994

(Continued)

OTHER PUBLICATIONS

International Search Report of International Application No. PCT/JP2021/022855 issued on Sep. 7, 2021.

(Continued)

*Primary Examiner* — Bernard Rojas
(74) *Attorney, Agent, or Firm* — SHINJYU GLOBAL IP

(57) ABSTRACT

An electromagnetic relay includes a base, a first fixed terminal including a first fixed contact, a second fixed terminal including a second fixed contact, a movable contact piece, a movable member, and a return spring. The movable contact piece includes a pair of movable contacts configured to contact the first fixed contact and the second fixed contact. The movable member is movable with the movable contact piece in a contact direction and in a separation direction. The return spring is disposed between the base and the movable member and urges the movable member in the separation direction. The base includes a guide portion to guide movement of the movable member. The movable member includes a sliding portion slidable with respect to the guide portion. The return spring is disposed inside the guide portion. The guide portion is disposed in the contact direction with respect to the first fixed contact.

14 Claims, 11 Drawing Sheets

(56) References Cited

FOREIGN PATENT DOCUMENTS

| | | | |
|---|---|---|---|
| JP | 2008-97893 | A | 4/2008 |
| JP | 2014-15910 | A | 1/2014 |

OTHER PUBLICATIONS

Written Opinion of the International Searching Authority of International Application No. PCT/JP2021/022855 issued on Sep. 7, 2021.

* cited by examiner

ELECTROMAGNETIC RELAY INCLUDING MOVABLE MEMBER THAT MOVES INTEGRALLY WITH MOVABLE CONTACT PIECE

CROSS-REFERENCE TO RELATED APPLICATION

This application is the U.S. National Phase of International Application No. PCT/JP2021/022855, filed on Jun. 16, 2021. This application claims priority to Japanese Patent Application No. 2020-116254, filed Jul. 6, 2020. The contents of those applications are incorporated by reference herein in their entireties.

FIELD

The present invention relates to an electromagnetic relay.

BACKGROUND

An electromagnetic relay has been conventionally known that opens and closes an electrical circuit. For example, German Utility Model No. 202013006784 discloses an electromagnetic relay that includes a fixed terminal having a fixed contact, a movable contact piece having a movable contact, and a movable member for transmitting the rotation of a movable iron core to the movable contact piece. The movable contact piece slides with respect to the movable member in response to the movement of the movable member.

SUMMARY

In the electromagnetic relay of German Utility Model No. 202013006784, the movable contact piece and the movable member slide on each other, and the abrasion powder generated by the sliding is likely to adhere to the fixed contact or the movable contact. Any abrasion powder adhering to the fixed contact or the movable contact increases the contact resistance between the contacts, leading to degradation in performance of electrical conduction.

An object of the present invention is to decrease adhering of abrasion power to the contacts in an electromagnetic relay.

An electromagnetic relay according to one aspect of the present invention includes a base, a first fixed terminal, a second fixed terminal, a movable contact piece, a movable member, and a return spring. The first fixed terminal includes a first fixed contact and is supported by the base. The second fixed terminal includes a second fixed contact and is supported by the base at a position separated from the first fixed terminal. The movable contact piece includes a pair of movable contacts configured to contact the first fixed contact and the second fixed contact. The movable contact piece is fixed to the movable member, and the movable member is movable in a contact direction in which the first fixed contact and the second fixed contact come into contact with the pair of movable contacts and in a separation direction in which the first fixed contact and the second fixed contact are separated from the pair of movable contacts. The return spring is disposed between the base and the movable member and urges the movable member in the separation direction. The base includes a guide portion to guide the movement of the movable member. The movable member includes a sliding portion slidable with respect to the guide portion. The return spring is disposed inside the guide portion. The guide portion is disposed in the contact direction with respect to the first fixed contact and the second fixed contact.

In the electromagnetic relay, the movable contact piece is fixed to the movable member. In other words, the movable contact piece and the movable member do not slide on each other, and thereby no abrasion power is generated by sliding between the movable contact piece and the movable member. As such, it is possible to decrease the adhesion of the abrasion powder to the first fixed contact, the second fixed contact, or the pair of movable contacts. Further, since the guide portion is disposed closer to the contact direction side than the first fixed contact and the second fixed contact, the guide portion is disposed at a position apart from the first fixed contact, the second fixed contact, and the pair of movable contacts. As a result, it is possible to decrease the adhesion of the abrasion powder, which is generated by the sliding of the movable member along the guide portion, to the first fixed contact, the second fixed contact, or the pair of movable contacts. Furthermore, since the return spring is disposed inside the guide portion, it is possible to decrease the adhesion of the abrasion powder generated between the return spring and the base to the first fixed contact, the second fixed contact, or the pair of movable contacts.

The sliding portion may have a first end on the contact direction side. The guide portion may have a second end on the separation direction side. The first end may be positioned in the contact direction with respect to the second end. In this case, the return spring is not exposed in the space where the first fixed contact, the second fixed contact, and the pair of movable contacts are disposed. Thus, it is possible to further decrease the adhesion of the abrasion powder generated by the contact between the movable member and the return spring and the abrasion powder generated by the sliding of the sliding portion along the guide portion to the first fixed contact, the second fixed contact, or the pair of movable contacts.

The base may include a recess recessed in the separation direction. The sliding portion and the return spring may be disposed inside the recess. The guide portion may be constituted by part of the recess. In this case, the movable member can be guided to move by a simple configuration.

The movable member may include a first spring housing portion opposite the recess to house the return spring partially. The return spring may be surrounded by the recess and the first spring housing portion. In this case, it is possible to further decrease the adhesion of the abrasion powder generated by the contact between the movable member and the return spring and the abrasion powder generated by the sliding of the sliding portion along the guide portion to the first fixed contact, the second fixed contact, or the pair of movable contacts.

One of the base or the movable member may include a positioning portion configured to position the return spring. In this case, positioning of the return spring is facilitated.

The sliding portion may have a first end on the contact direction side. The guide portion may have a second end on the separation direction side. At least one of the first end or the second end may have a C-chamfered shape or an R-chamfered shape. In this case, it is possible to decrease the abrasion powder generated by sliding of the sliding portion along the guide portion. Also, the assembly is facilitated.

The electromagnetic relay may further include a contact spring configured to urge the movable member in the contact direction. The movable member may include a second spring housing portion configured to house the contact spring partially. In this case, it is possible to further decrease the adhesion of the abrasion powder generated by contact between the movable member and the contact spring to the first fixed contact, the second fixed contact, or the pair of movable contacts.

The electromagnetic relay may further include a contact spring configured to urge the movable member in the contact direction, and a first spring bearing member disposed between the contact spring and the movable member. The contact spring may urge the movable member in the contact direction via the first spring bearing member. In this case, for example, the first spring bearing member may be formed of a material such as stainless steel, so that less abrasion powder is generated compared to the case where the contact spring is brought into direct contact with the movable member.

The electromagnetic relay may further include a second spring bearing member disposed between the return spring and the movable member. The return spring may urge the movable member in the separation direction via the second spring bearing member. In this case, for example, the second spring bearing member may be formed of a material such as stainless steel, so that less abrasion powder is generated compared to the case where the contact spring is brought into direct contact with the movable member.

The movable contact piece may be fixed to the movable member by insert molding. In this case, the movable contact piece can be easily fixed to the movable member.

The movable member may be composed of at least two components including a first component and a second component. The movable contact piece may be fixed to the movable member in a state in which the movable contact piece is sandwiched between the first component and the second component. In this case as well, the movable contact piece can be easily fixed to the movable member.

The electromagnetic relay may further include an elastic member disposed between the first component and the movable contact piece or between the second component and the movable contact piece. The movable contact piece may be fixed to the movable member via the elastic member. In this case, the movable contact piece can be firmly fixed to the movable member.

The first component and the second component may be formed of different materials. In this case, the degree of freedom in design increases.

The first component may be formed of an insulating material. The second component may be formed of a metal material and may be disposed in the contact direction with respect to the first component. In this case, heat generation of a contact device can be reduced by the second component while ensuring the insulation by the first component.

DETAILED DESCRIPTION

Figure 1:
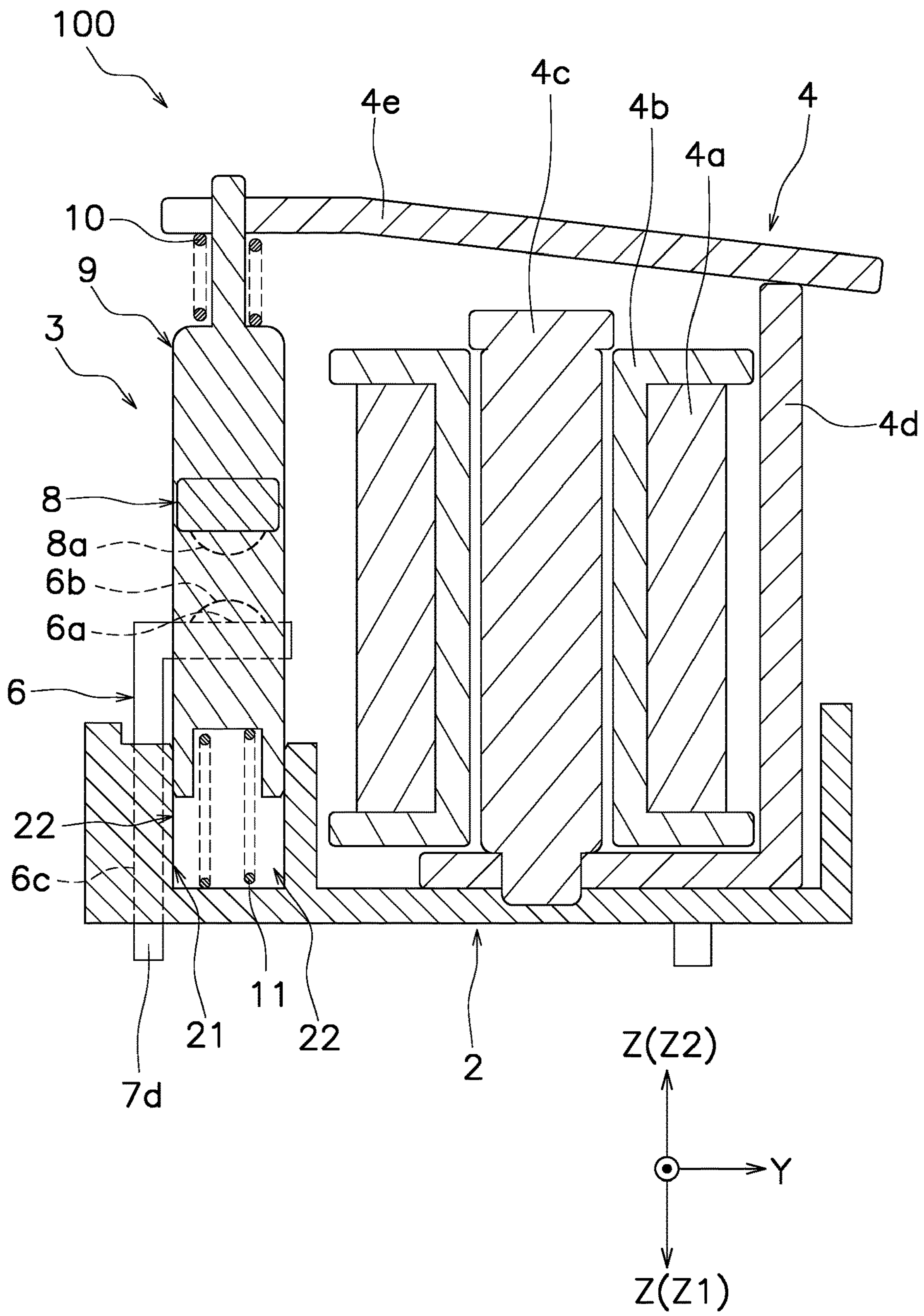
FIG. 1 is a schematic cross-sectional diagram of an electromagnetic relay, viewed from the X direction.

Hereinafter, an electromagnetic relay of an embodiment according to an aspect of the present invention will be described with reference to the drawings. When referring to the drawings, the up-down direction in FIG. 1 is referred to as "Z direction," the left-right direction as "Y direction," the direction orthogonal to the plane of FIG. 1 as "X direction." The Z direction toward the upper side in FIG. 1 is referred to as "Z2 direction," and the Z direction toward the lower side as "Z1 direction." However, these directions are defined for the convenience of description and are not intended to limit the directions of arrangements of an electromagnetic relay.

FIG. 1 is a schematic cross-sectional diagram of an electromagnetic relay 100, viewed from the X direction. The electromagnetic relay 100 includes a base 2, a contact device 3, and a drive device 4. The base 2 is formed of an insulating material such as resin. The base 2 is substantially rectangular when viewed from the Z direction. The base 2 supports the contact device 3 and the drive device 4. The contact device 3 and the drive device 4 are covered by a case (not shown) that is attached to the base 2.

Figure 2:
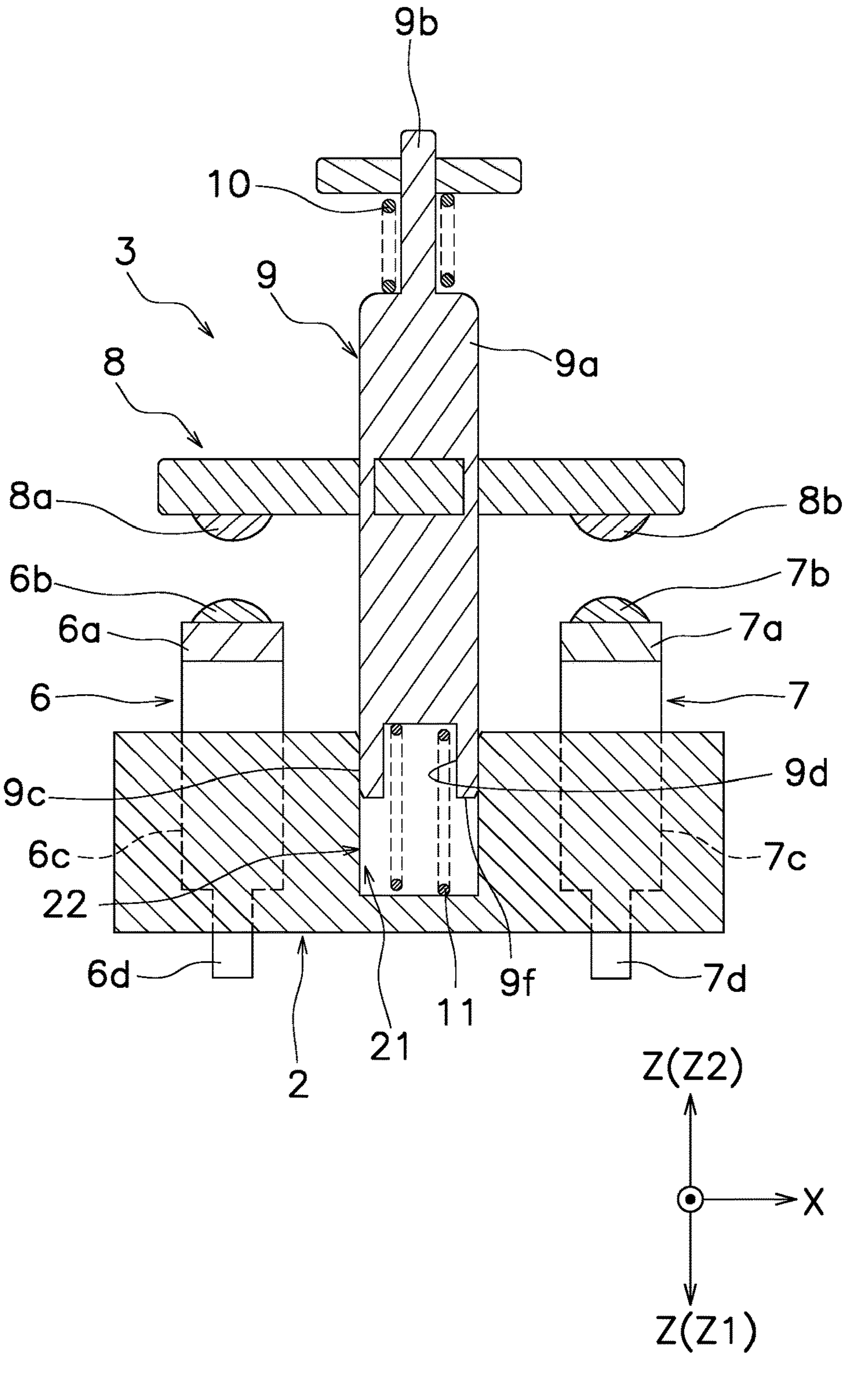
FIG. 2 is a schematic cross-sectional diagram of and around a contact device, viewed from the Y direction.

FIG. 2 is a schematic cross-sectional diagram of and around the contact device 3, viewed from the Y direction. The contact device 3 is supported by the base 2. The contact device 3 includes a first fixed terminal 6, a second fixed terminal 7, a movable contact piece 8, a movable member 9, a contact spring 10, and a return spring 11. The first fixed terminal 6, the second fixed terminal 7, and the movable contact piece 8 are each a plate-shaped terminal and are formed of a conductive material such as copper.

As shown in FIG. 2, the first fixed terminal 6 is substantially L-shaped when viewed from the X direction. The first fixed terminal 6 may be substantially U-shaped for example, when viewed from the X direction. The first fixed terminal 6 is supported by the base 2.

The first fixed terminal 6 includes a first contact support portion 6*a*, a first fixed contact 6*b*, a supported portion 6*c*, and an external connection portion 6*d*. The first contact support portion 6*a* extends in the X direction and the Y axis direction. The first fixed contact 6*b* is disposed on the first contact support portion 6*a*. The first fixed contact 6*b* protrudes in the Z2 direction from the first contact support portion 6*a*. In the present embodiment, the first fixed contact 6*b* is a separate body from the first fixed terminal 6, but may be integrated with the first fixed terminal 6. The supported portion 6*c* extends in the X direction and the Z direction. The supported portion 6*c* is supported by the base 2. The supported portion 6*c* is fixedly press-fitted to the base 2, for example. The external connection portion 6*d* protrudes from the base 2 in the Z1 direction and is to be electrically connected to an external device (not shown).

The second fixed terminal 7 has the same shape as that of the first fixed terminal 6. The second fixed terminal 7 is supported by the base 2 at a position separated from the first fixed terminal 6 in the X direction. The second fixed terminal 7 includes a second contact support portion 7*a*, a second fixed contact 7*b*, a supported portion 7*c*, and an external connection portion 7*d*. Since the portions of the second fixed terminal 7 have the same configurations as those of the first fixed terminal 6, description thereof is omitted.

The movable contact piece 8 extends in the X direction. The movable contact piece 8 has a longitudinal direction corresponding to the X direction. The movable contact piece 8 is disposed closer to the Z2 direction side than the first fixed terminal 6 and the second fixed terminal 7. The movable contact piece 8 is disposed at a position to oppose the first contact support portion 6*a* and the second contact support portion 7*a* in the Z direction.

The movable contact piece 8 includes a pair of movable contacts 8*a*, 8*b* configured to contact the first fixed contact 6*b* and the second fixed contact 7*b*. In the following, as for the pair of movable contacts 8*a*, 8*b* for opening and closing, the contact to be contacted with the first fixed contact 6*b* is referred to as the first movable contact 8*a*, and the contact to be contacted with the second fixed contact 7*b* is referred to as the second movable contact 8*b*. The first movable contact 8*a* is disposed at a position opposite the first fixed contact 6*b* in the Z direction. The first movable contact 8*a* protrudes in the Z1 direction from the surface of the movable contact piece 8 directed in the Z1 direction. In the present embodiment, the first movable contact 8*a* is a separate body from the movable contact piece 8, but may be integrated with the movable contact piece 8.

The second movable contact 8*b* is disposed apart from the first movable contact 8*a* in the X direction. The second movable contact 8*b* is disposed at a position opposite the second fixed contact 7*b* in the Z direction. The second movable contact 8*b* protrudes in the Z1 direction from the surface of the movable contact piece 8 directed in the Z1 direction. In the present embodiment, the first movable contact 8*a* is a separate body from the movable contact piece 8, but may be integrated with the movable contact piece 8.

The movable contact piece 8 is disposed to be movable in a contact direction in which the first fixed contact 6*b* and the second fixed contact 7*b* come in contact with the pair of movable contacts 8*a* and 8*b* and in a separation direction in which the first fixed contact 6*b* and the second fixed contact 7*b* are separated from the pair of movable contacts 8*a* and 8*b*. The contact direction in the present embodiment corresponds to the Z1 direction, and the separation direction corresponds to the Z2 direction.

Figure 4:
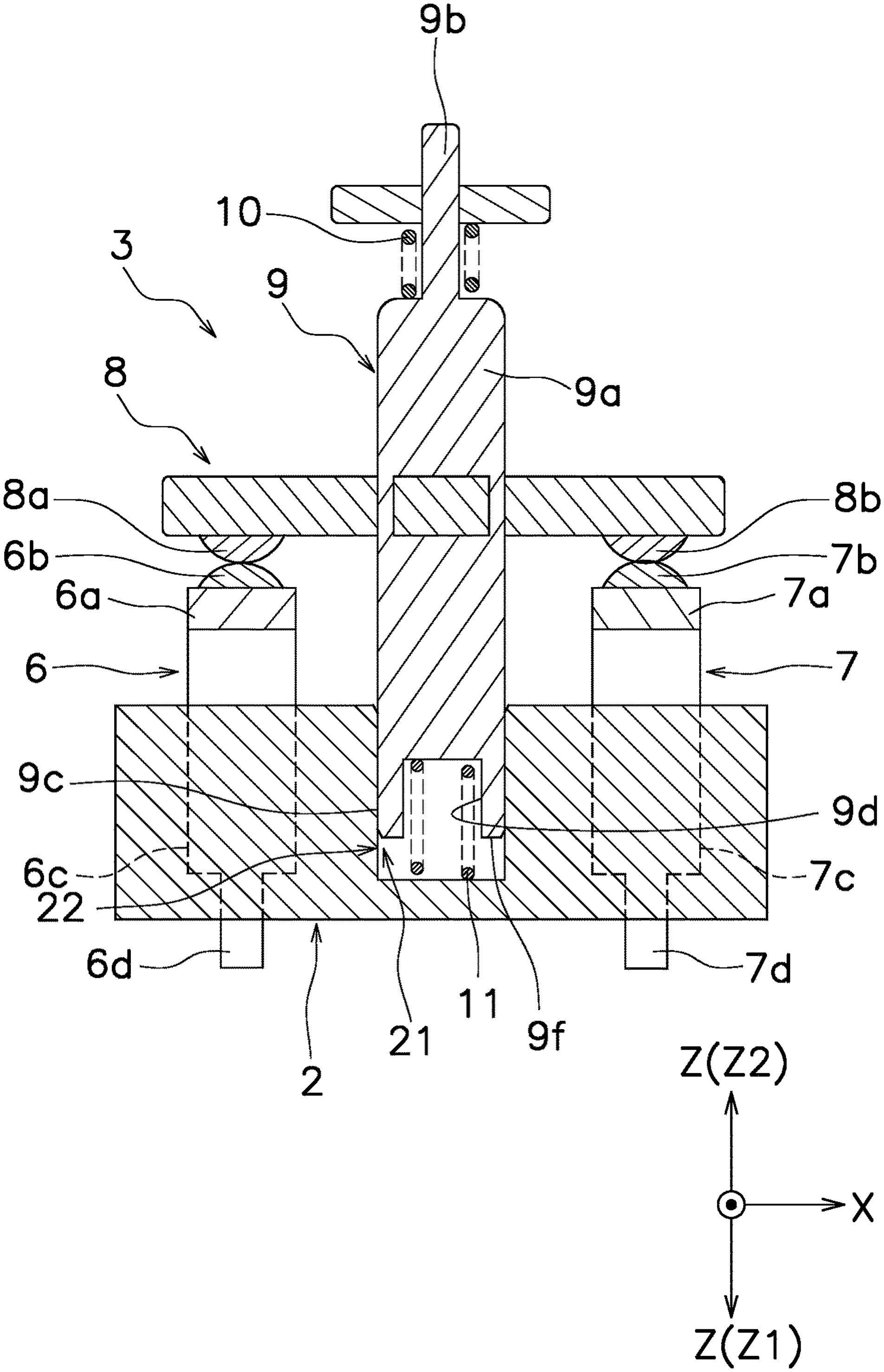
FIG. 4 is a schematic cross-sectional diagram of and around the contact device, viewed from the Y direction.

The movable member 9 is disposed movably in the Z1 direction (contact direction) and the Z2 direction (separation direction). The movable member 9 is disposed movably between the open position shown in FIG. 2 and the closed position shown in FIG. 4. At the closed position, the pair of movable contacts 8*a*, 8*b* is in contact with the first fixed contact 6*b* and the second fixed contact. In the open position, the pair of movable contacts 8*a*, 8*b* is in separation from the first fixed contact 6*b* and the second fixed contact 7*b*.

The movable member 9 is formed of an insulating material such as resin. The movable contact piece 8 is fixed to the movable member 9. In the present embodiment, the movable contact piece 8 is fixed to the movable member 9 by insert molding. Accordingly, the movable contact piece 8 moves integrally with the movable member 9 as the movable member 9 moves in the Z1 and Z2 directions.

Figure 3:
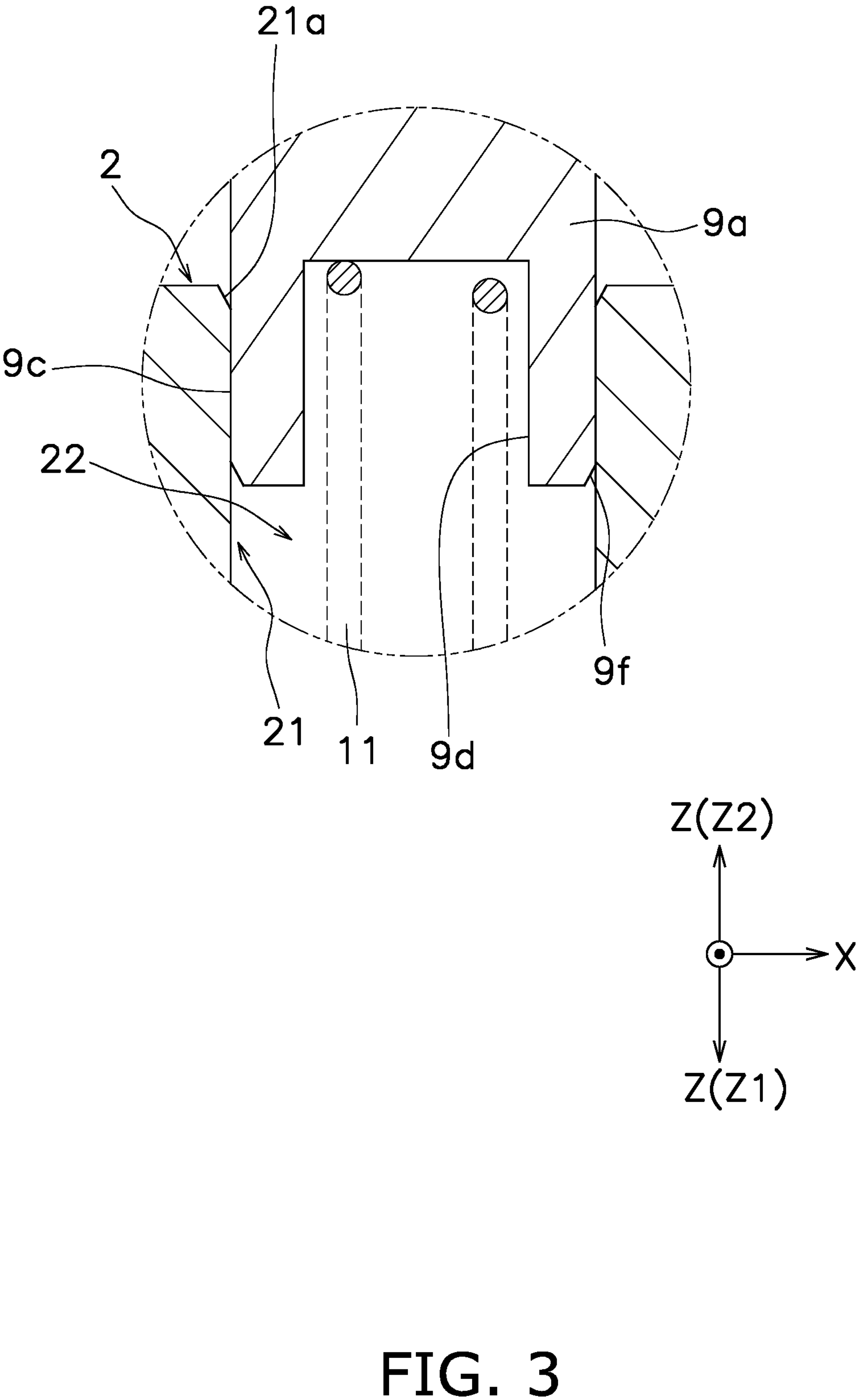
FIG. 3 is a partially enlarged diagram of FIG. 2.

Here, the base 2 includes a guide portion 21 and a recess 22. The guide portion 21 guides the movement of the movable member 9. In the present embodiment, the guide portion 21 is constituted by part of the recess 22 that is recessed in the Z2 direction. Specifically, the guide portion 21 is constituted by the inner surfaces of the recess 22. The guide portion 21 has a non-circular shape when viewed from the Z2 direction. The guide portion 21 is disposed closer to the Z1 direction side than the pair of movable contacts 8*a*, 8*b*. The guide portion 21 is disposed closer to the Z1 direction side than the first fixed contact 6*b* and the second fixed contact 7*b*. The guide portion 21 is disposed between the first fixed terminal 6 and the second fixed terminal 7 in the X direction. The guide portion 21 is open in the Z2 direction. The guide portion 21 is C-chamfered or R-chamfered at the end 21*a* in the Z2 direction, as enlarged in FIG. 3.

The movable member 9 is guided by the guide portion 21 to move in the Z1 and Z2 directions. The movement of the movable member 9 in the X and Y directions is restricted by the guide portion 21. The sliding portion 9*c* is restricted by the guide portion 21 from rotating around its axis parallel to the Z direction.

The movable member 9 includes a shaft 9*a*, a spring mounting portion 9*b*, a sliding portion 9*c*, and a first spring housing portion 9*d*. The shaft 9*a* is substantially cylindrical and extends in the Z direction. The movable contact piece 8 is fixed to the shaft 9*a*. The spring mounting portion 9*b* is formed at the end of the shaft 9*a* in the Z2 direction. The spring mounting portion 9*b* is substantially cylindrical and extends in the Z2 direction. The spring mounting portion 9*b* has an outer diameter smaller than the outer diameter of the shaft 9*a*. To the spring mounting portion 9*b*, a contact spring 10 is mounted.

The sliding portion 9*c* is a part guided by the guide portion 21 and slides along the guide portion 21 in the Z direction. The sliding portion 9*c* is disposed inside the recess 22. The sliding portion 9*c* is located at the end of the shaft 9*a* in the Z1 direction. The sliding portion 9*c* is non-circular when viewed from the Z2 direction. The sliding portion 9*c* has a shape that conforms the shape of the guide portion 21. The sliding portion 9*c* is chamfered or rounded at the end 9*f* in the Z1 direction, as enlarged in FIG. 3. The end 9*f* is positioned closer to the Z1 direction side than the end 21*a* of the guide portion 21. Specifically, when the movable member 9 is in the open position and the closed position, the end 9*f* is positioned closer to the Z1 direction side than the end 21*a* of the guide portion 21.

The first spring housing portion 9*d* is disposed opposite the recess 22 in the Z direction. The first spring housing portion 9*d* is recessed in the Z2 direction from the end of the shaft 9*a* in the Z1 direction. The first spring housing portion 9*d* is configured to house the return spring 11 partially. In the present embodiment, the first spring housing portion 9*d* is able to house one end of the return spring 11 in the Z2 direction.

The contact spring 10 is mounted to increase the contact pressure of the pair of movable contacts 8*a*, 8*b* against the first fixed contact 6*b* and the second fixed contact 7*b*. The contact spring 10 urges the movable member 9 in the Z1 direction. The contact spring 10 is supported by the spring mounting portion 9*b*. The contact spring 10 is disposed between a movable iron piece 4*e* and a shaft 9*a*, which will be described later.

The return spring 11 is disposed between the base 2 and the movable member 9 and urges the movable member 9 in the Z2 direction. The return spring 11 is disposed inside the recess 22. At least part of the return spring 11 is housed in the recess 22. The return spring 11 is surrounded by the recess 22 and the first spring housing portion 9*d*. The return spring 11 is positioned by the first spring housing portion 9*d*.

The drive device 4 is disposed apart from the contact device 3 in the Y direction. The drive device 4 is supported by the base 2. The drive device 4 uses electromagnetic force to move the movable member 9. The drive device 4 includes a coil 4*a*, a spool 4*b*, a fixed iron core 4*c*, a yoke 4*d*, and a movable iron piece 4*e*. The coil 4*a* is wound around the outer circumference of the spool 4*b*. The spool 4*b* extends in the Z direction. The fixed iron core 4*c* extends in the Z direction and is disposed inside the spool 4*b*. The yoke 4*d* is disposed to surround the coil 4*a*. The yoke 4*d* is connected to the fixed iron core 4*c*. The movable iron piece 4*e* has one end rotatably supported by the yoke 4*d*, and the other end connected to the spring mounting portion 9*b* of the movable member 9 to be in contact with the contact spring 10.

Next, the operations of the electromagnetic relay 100 will be described. While no voltage is applied to the coil 4*a*, the elastic force of the return spring 11 presses the movable member 9 in the Z2 direction, and the movable member 9 is positioned in the open position shown in FIG. 2. When a voltage is applied to the coil 4*a* to excite the drive device 4, the movable iron piece 4*e* is attracted to the fixed iron core 4*c* and rotates, and the movable member 9 is pressed via the contact spring 10 in the Z1 direction. Then, the movable member 9 moves to the closed position shown in FIG. 4 against the elastic force of the return spring 11. As the movable member 9 moves to the closed position, the movable contact piece 8 moves integrally with the movable member 9, and the pair of movable contacts 8*a*, 8*b* come into contact with the first fixed contact 6*b* and the second fixed contact 7*b*. Note that when the application of voltage to the coil 4*a* is stopped, the movable member 9 is moved in the Z2 direction to the open position by the elastic force of the return spring 11.

In the electromagnetic relay 100 configured as described above, the movable contact piece 8 is fixed to the movable member 9. In other words, since the movable contact piece 8 and the movable member 9 do not slide on each other, no wear powder is generated due to sliding between the movable contact piece 8 and the movable member 9. Therefore, it is possible to decrease the adhesion of abrasion powder to the first fixed contact 6*b*, the second fixed contact 7*b*, or the pair of movable contacts 8*a*, 8*b*. Further, since the guide portion 21 is disposed closer to the Z1 direction side than the first fixed contact 6*b* and the second fixed contact 7*b*, the guide portion 21 is at a position apart from the first fixed contact 6*b*, the second fixed contact 7*b*, and the pair of movable contacts 8*a*, 8*b*. As a result, it is possible to decrease the adhesion of the abrasion powder, which is generated by the sliding of the movable member 9 along the guide portion 21, to the first fixed contact 6*b*, the second fixed contact 7*b*, or the pair of movable contacts 8*a*, 8*b*. Furthermore, since the return spring 11 is disposed inside the guide portion 21, it is possible to decrease the adhesion of the abrasion powder, which is generated between the return spring 11 and the base 2, to the first fixed contact 6*b*, the second fixed contact 7*b*, or the pair of movable contacts 8*a*, 8*b*.

In the present embodiment, the return spring 11 is surrounded by the recess 22 and the first spring housing portion 9*d*. When the movable member 9 is in the open position, the end 9*f* of the sliding portion 9*c* is positioned closer to the Z1 direction side than the end 21*a* of the guide portion 21. Thus, the return spring 11 is not exposed to the space where the first fixed contact 6*b*, the second fixed contact 7*b* and the pair of movable contacts 8*a*, 8*b* are disposed. As such, it is possible to further decrease the adhesion of the abrasion powder generated by the sliding of the movable member 9 along the guide portion 21 to the first fixed contact 6*b*, the second fixed contact 7*b*, or the pair of movable contacts 8*a*, 8*b*.

One embodiment of the electromagnetic relay according to one aspect of the present invention has been described above, but the present invention is not limited to the above embodiment, and various modifications are possible without departing from the gist of the invention. For example, the configurations of the base 2, the contact device 3, and the drive device 4 may be changed.

Figure 5:
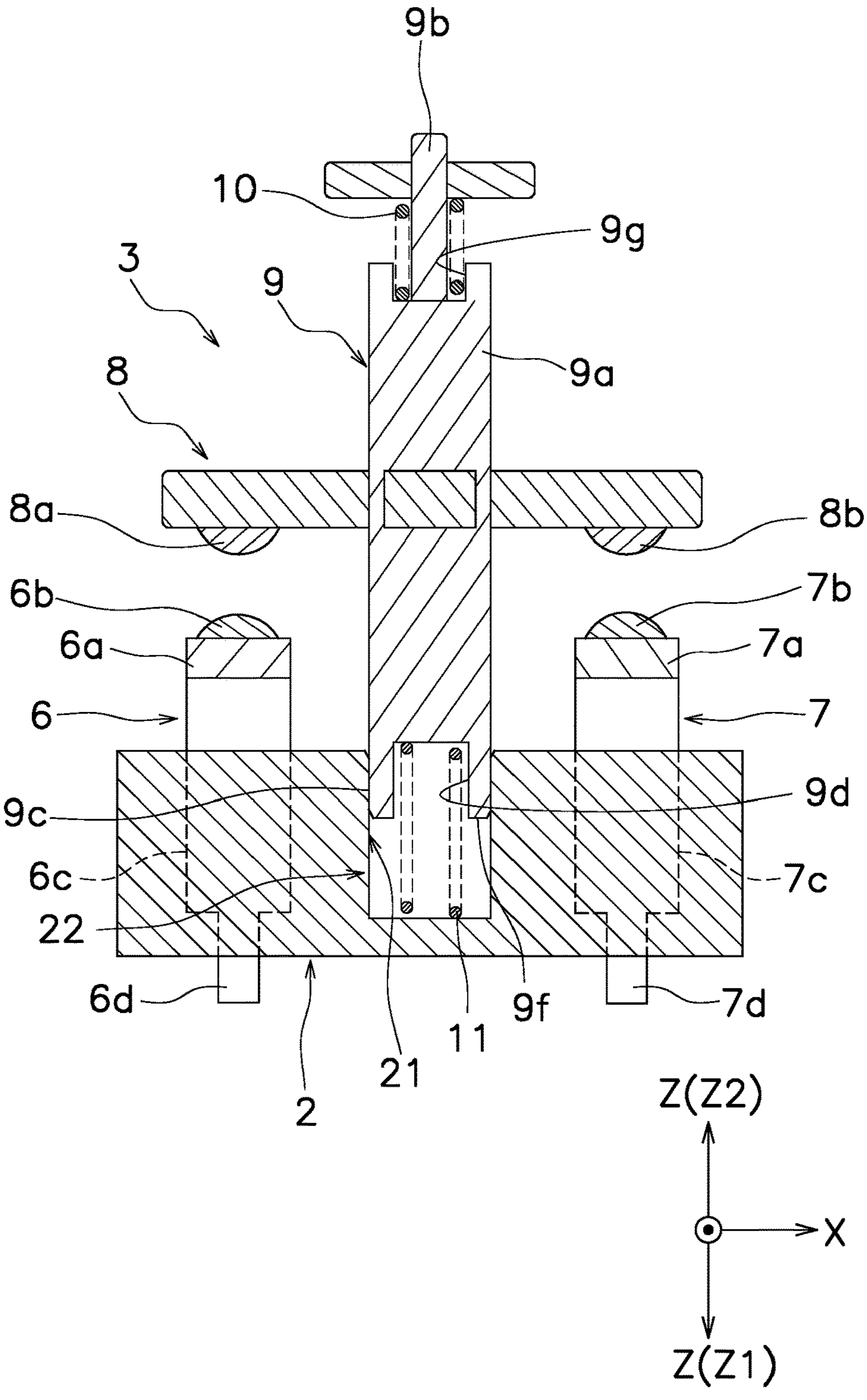
FIG. 5 is a schematic cross-sectional diagram of and around a contact device according to a modification, viewed from the Y direction.

The configuration of the movable member 9 may be changed. For example, as shown in FIG. 5, the movable member 9 may further include a second spring housing portion 9*g*. The second spring housing portion 9*g* is formed at the end of the shaft 9*a* in the Z2 direction. The second spring housing portion 9*g* is a recess recessed in the Z1 direction at the end of the shaft 9*a* located in the Z2 direction. The second spring housing portion 9*g* is configured to house the contact spring 10 partially. In the present embodiment, the second spring housing portion 9*g* is configured to house the end of the contact spring 10 in the Z1 direction. The second spring housing portion 9*g* surrounds at least a part of the contact spring 10 when the movable member 9 is in the open position. In this case, it is possible to decrease the adhesion of the abrasion powder, which is generated between the contact spring 10 and the movable member 9, to the first fixed contact 6*b*, the second fixed contact 7*b*, or the pair of movable contacts 8*a*, 8*b*.

Figure 6:
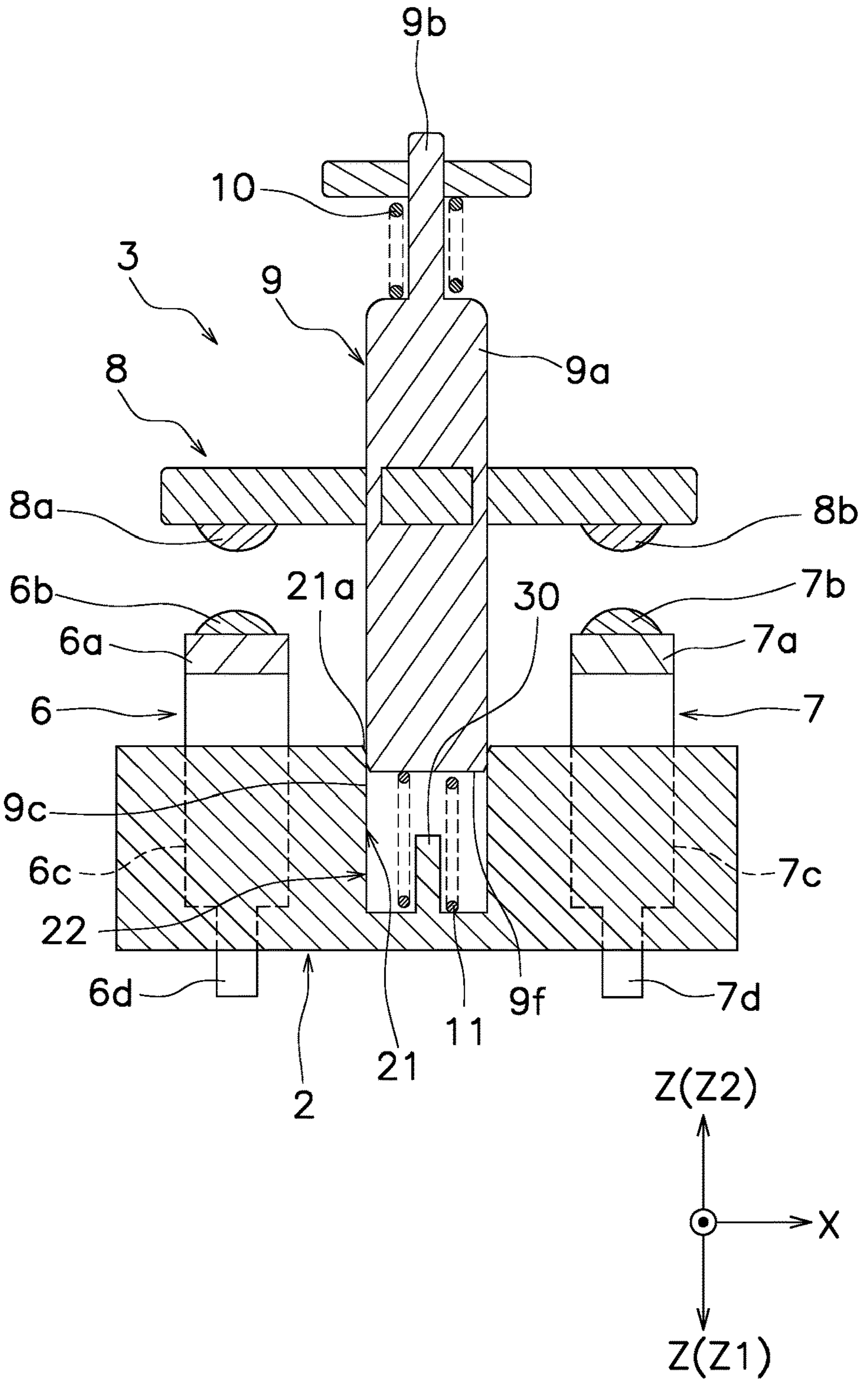
FIG. 6 is a schematic cross-sectional diagram of and around a contact device according to a modification, viewed from the Y direction.

In addition, as shown in FIG. 6, the first spring housing portion 9*d* may be omitted. In this case, one of the base 2 or the movable member 9 may include a positioning portion 30 for positioning the return spring 11. In the example shown in FIG. 6, the positioning portion 30 protrudes from the bottom of the recess 22 in the Z2 direction. Note that the positioning portion 30 may be formed to protrude in the Z1 direction from the shaft 9*a* of the movable member 9, or the bottom of the recess 22 may be recessed in the Z1 direction to form the positioning portion 30. In this case as well, when the movable member 9 is in the open position, the end 9*f* of the sliding portion 9*c* is preferably positioned closer to the Z1 direction side than the end 21*a* of the guide portion 21.

Figure 7:
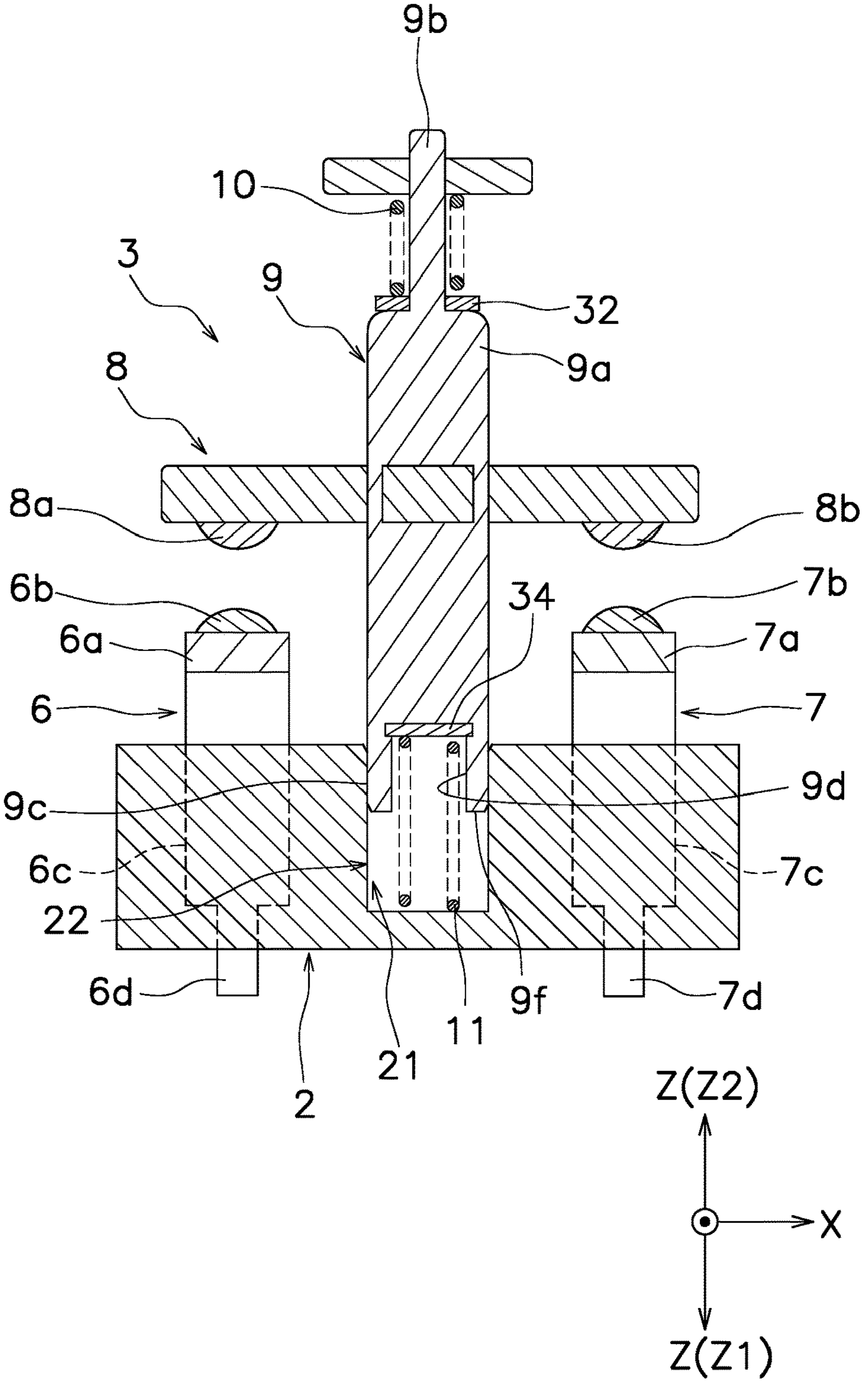
FIG. 7 is a schematic cross-sectional diagram of and around a contact device according to a modification, viewed from the Y direction.

As shown in FIG. 7, the electromagnetic relay 100 may further include a first spring bearing member 32 disposed between the contact spring 10 and the movable member 9. In the example shown in FIG. 7, the first spring bearing member 32 is disposed on the end of the shaft 9*a* in the Z2 direction. The first spring bearing member 32 is formed of a material such as stainless steel, for example. The contact spring 10 may press the movable member 9 in the Z1 direction via the first spring bearing member 32. In this case, the generation of abrasion powder can be decreased as compared with the case where the contact spring 10 is brought into direct contact with the shaft 9*a*. Similarly, a second spring bearing member 34 may be disposed between the return spring 11 and the movable member 9 to urge the movable member 9 in the Z2 direction via the second spring bearing member 34. The second spring bearing member 34 may be disposed, for example, in the first spring housing portion 9*d*.

Figure 8:
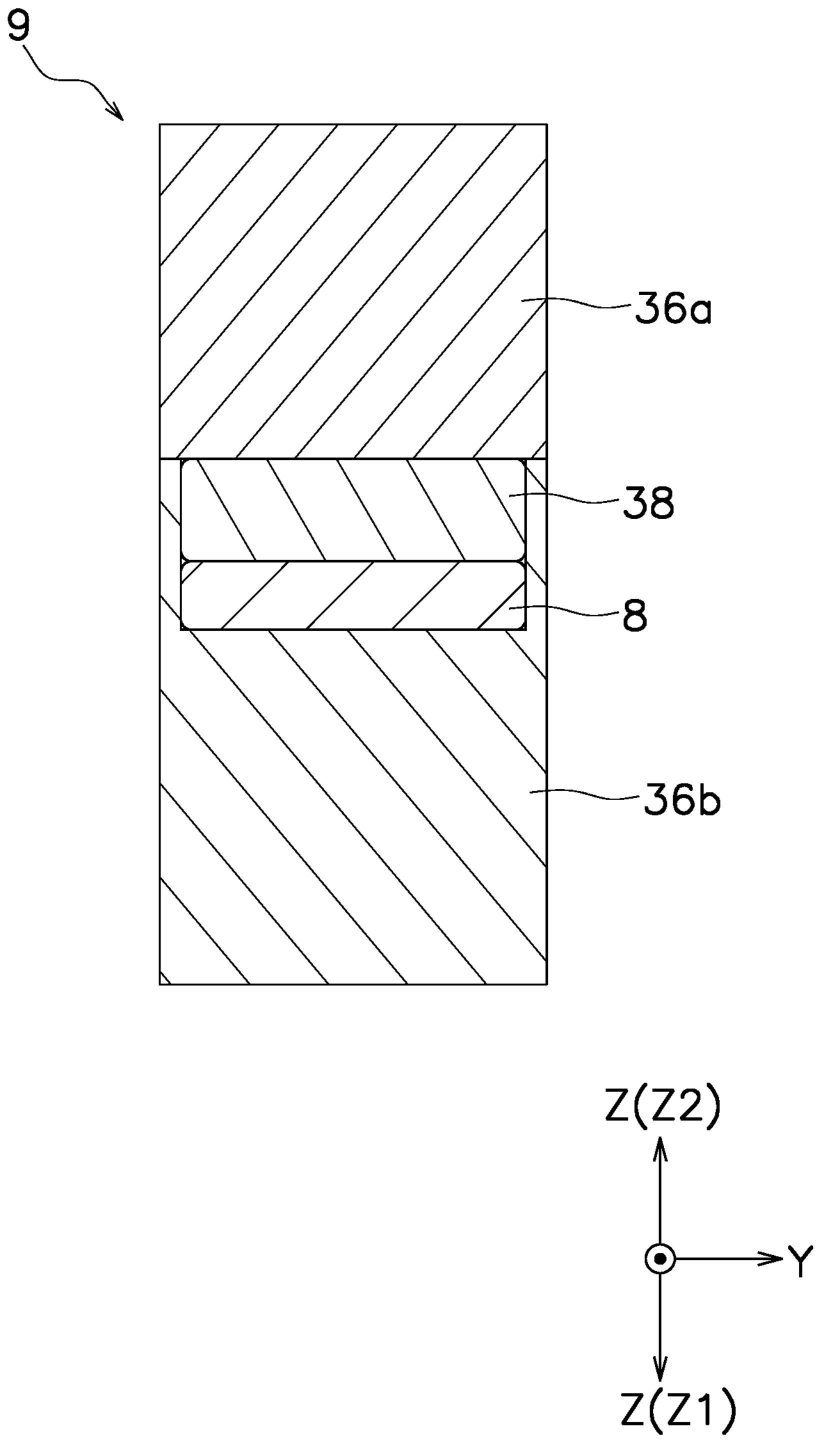
FIG. 8 is a partial cross-sectional diagram of a movable member according to a modification, viewed from the X direction.
Figure 9:
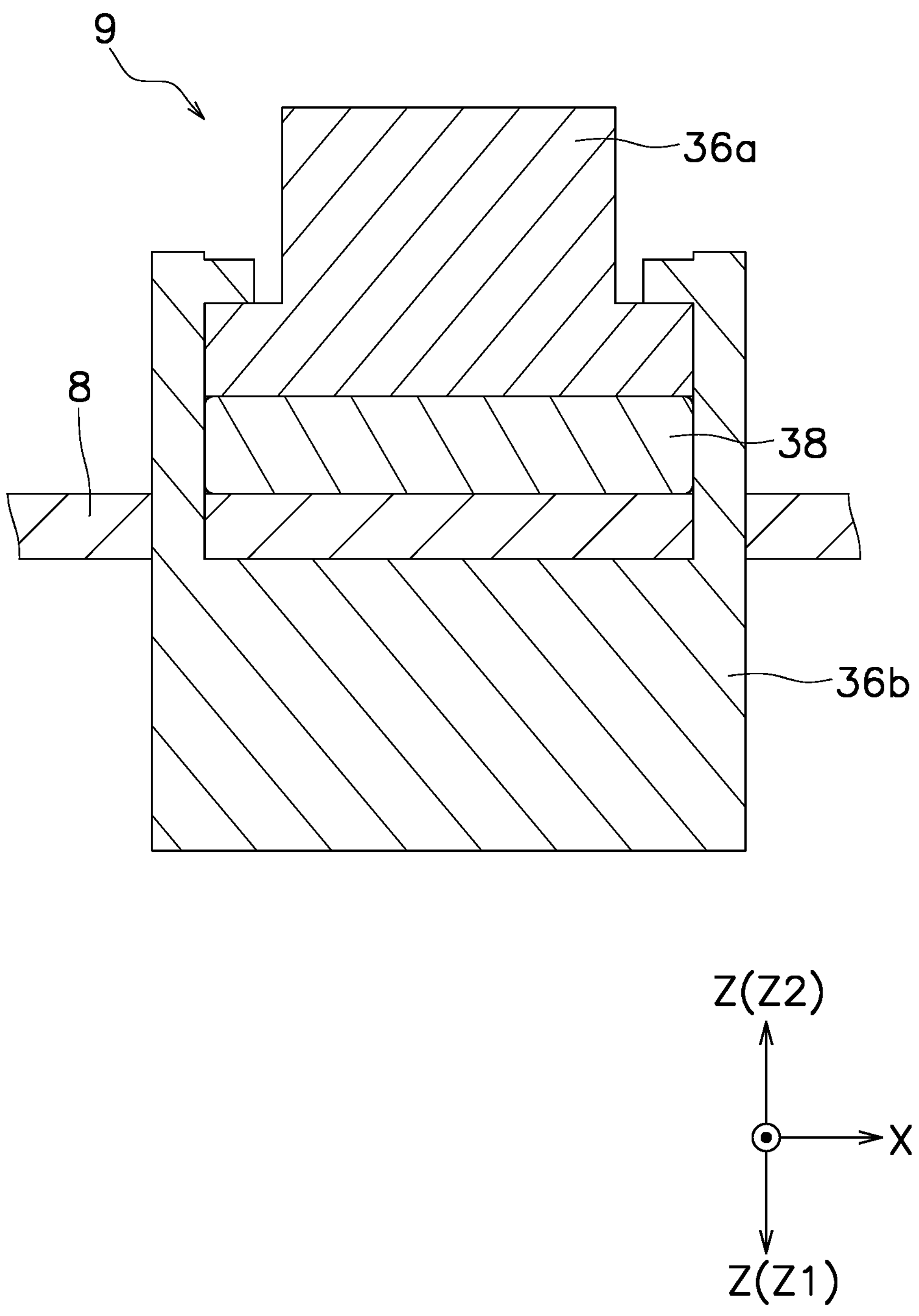
FIG. 9 is a partial cross-sectional diagram of the movable member according to a modification, viewed from the Y direction.

In the present embodiment, the movable contact piece 8 is fixed to the movable member 9 by insert molding, but the means for fixing the movable contact piece 8 to the movable member 9 is not limited to the embodiment. FIG. 8 is a partial cross-sectional diagram of the movable member 9 according to a modification, viewed from the X direction. FIG. 9 is a partial cross-sectional diagram of the movable member 9 according to the modification, viewed from the Y direction. As shown in FIGS. 8 and 9, the movable member 9 may be composed of two or more components including a first component 36*a* and a second component 36*b*.

In the example shown in FIGS. 8 and 9, the movable member 9 is composed of two components: the first component 36*a* and the second component 36*b*. The movable contact piece 8 is fixed to the movable member 9 while being sandwiched between the first component 36*a* and the second component 36*b* in the Z direction. Specifically, the movable contact piece 8 may be fixed to the movable member 9 by snap-fitting or crimping between the first component 36*a* and the second component 36*b* in a state in which the movable contact piece 8 is sandwiched between the first component 36*a* and the second component 36*b*. In the case, in order to firmly fix the movable contact piece 8 to the movable member 9, an elastic member 38 may be disposed between the first component 36*a* and the movable contact piece 8 or between the second component 36*b* and the movable contact piece 8. The elastic member 38 is, for example, a highly rigid spring member. In the example shown in FIGS. 8 and 9, the elastic member 38 is disposed between the movable contact piece 8 and the first component 36*a* in the Z direction.

The movable member 9 may be formed of two or more materials. For example, in the case where the movable member 9 is composed of two components, the first component 36*a* and the second component 36*b*, the first component 36*a* and the second component 36*b* may be formed of different materials. For example, one of the first component 36*a* or the second component 36*b* may be formed of an insulating material such as resin, and the other of the first component 36*a* and the second component 36*b* may be formed of a metal material such as aluminum or stainless steel. In this case, it is preferable that the first component 36*a* disposed in the Z2 direction is formed of an insulating material, and the second component 36*b* disposed in the Z1 direction is formed of a metal material. As a result, heat generation of the contact device 3 can be reduced by the second component 36*b* while ensuring the insulation between the contact device 3 and the drive device 4 by the first component 36*a*.

Figure 10:
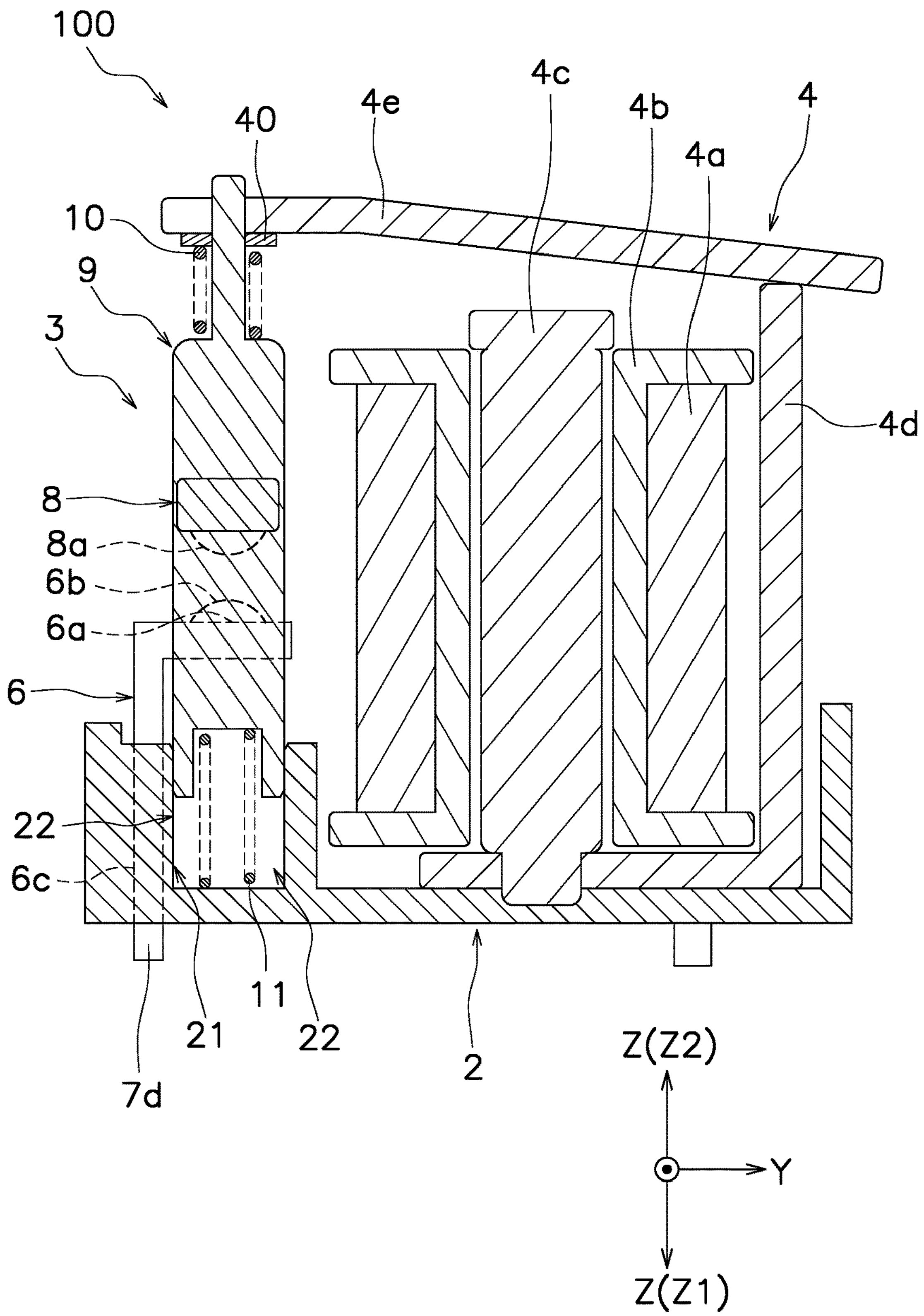
FIG. 10 is a schematic cross-sectional diagram of an electromagnetic relay according to a modification, viewed from the X direction.
Figure 11:
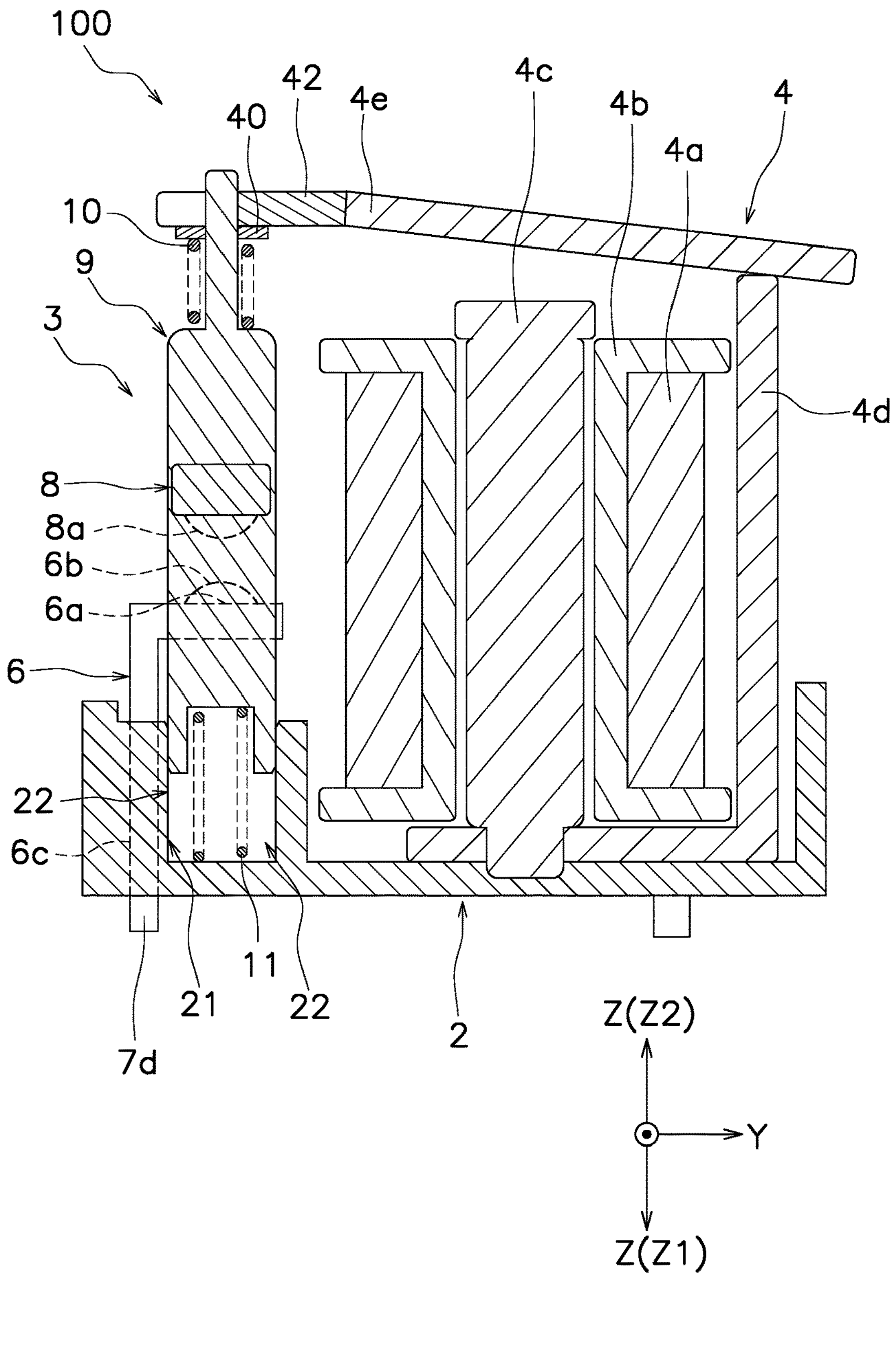
FIG. 11 is a schematic cross-sectional diagram of an electromagnetic relay according to a modification, viewed from the X direction.

In the above embodiment, the movable iron piece 4*e* directly contacts the contact spring 10 and presses the contact spring 10, but another configuration is possible in which the movable iron piece 4*e* indirectly presses the contact spring 10. For example, as shown in FIG. 10, the movable iron piece 4*e* may indirectly press the contact spring 10 via an intervening member 40. Alternatively, as shown in FIG. 11, the contact spring 10 may be indirectly pressed via another separate component 42 that is connected to the movable iron piece 4*e*. In these cases, for example, the intervening member 40 or the separate component 42 formed of an insulating material facilitates to ensure the insulation between the contact device 3 and the drive device 4. Note that the intervening member 40 may be omitted when the separate component 42 is used.

The electromagnetic relay 100 may further include a permanent magnet for generating a magnetic field that causes a Lorentz force to act on the arcs generated between the pair of movable contacts 8*a*, 8*b* and the first fixed contact 6*b* and the second fixed contact 7*b*.

REFERENCE NUMERALS

2 Base
6 First fixed contact
7 Second fixed contact
8 Movable contact piece
8*a*, 8*b* A pair of movable contacts
9 Movable member
9*c* Sliding portion
9*d* First spring housing portion
9*g* Second spring housing portion
10 Return spring
11 Contact spring
21 Guide portion
22 Recess
32 Spring bearing member
34 Spring bearing member
36*a* First component
36*b* Second component
100 Electromagnetic relay
Z1 Contact direction
Z2 Separation direction

The invention claimed is:

1. An electromagnetic relay comprising:
a base;
a first fixed terminal including a first fixed contact, the first fixed terminal being supported by the base;
a second fixed terminal including a second fixed contact, the second fixed terminal being supported by the base at a position separated from the first fixed terminal;
a movable contact piece including a pair of movable contacts, the pair of movable contacts configured to contact the first fixed contact and the second fixed contact;
a movable member to which the movable contact piece is fixed, the movable member being movable in a contact direction in which the first fixed contact and the second fixed contact come into contact with the pair of movable contacts and in a separation direction in which the first fixed contact and the second fixed contact are separated from the pair of movable contacts; and
a return spring disposed between the base and the movable member, the return spring configured to urge the movable member in the separation direction, wherein
the base includes a guide portion to guide movement of the movable member,
the movable member includes a sliding portion slidable with respect to the guide portion,
the return spring is disposed inside the guide portion,
the guide portion is disposed in the contact direction with respect to the first fixed contact and the second fixed contact, and
the movable contact piece is fixed to be immovable relative to the movable member in the contact and separation directions.

2. The electromagnetic relay according to claim 1, wherein
the sliding portion has a first end on a contact direction side and the guide portion has a second end on a separation direction side, the first end being positioned in the contact direction with respect to the second end.

3. The electromagnetic relay according to claim 1, wherein the base includes a recess recessed in the separation direction, the sliding portion and the return spring are disposed inside the recess, and the guide portion is constituted by part of the recess.

4. The electromagnetic relay according to claim 3, wherein the movable member includes a first spring housing portion opposite the recess, the first spring housing portion configured to house the return spring partially, and the return spring is surrounded by the recess and the first spring housing portion.

5. The electromagnetic relay according to claim 1, wherein one of the base or the movable member includes a positioning portion configured to position the return spring.

6. The electromagnetic relay according to claim 1, wherein the sliding portion has a first end on a contact direction side, the guide portion has a second end on a separation direction side, and at least one of the first end or the second end has a C-chamfered shape or an R-chamfered shape.

7. The electromagnetic relay according to claim 1, further comprising:

a contact spring configured to urge the movable member in the contact direction, wherein the movable member includes a second spring housing portion configured to house the contact spring partially.

8. The electromagnetic relay according to claim 1, further comprising:

a contact spring configured to urge the movable member in the contact direction; and a first spring bearing member disposed between the contact spring and the movable member, wherein the contact spring urges the movable member in the contact direction via the first spring bearing member.

9. The electromagnetic relay according to claim 1, further comprising:

a second spring bearing member disposed between the return spring and the movable member, wherein the return spring urges the movable member in the separation direction via the second spring bearing member.

10. The electromagnetic relay according to claim 1, wherein the movable contact piece is fixed to the movable member by insert molding.

11. An electromagnetic relay comprising:

a base;

a first fixed terminal including a first fixed contact the first fixed terminal being supported by the base;

a second fixed terminal including a second fixed contact, the second fixed terminal being supported by the base at a position separated from the first fixed terminal;

a movable contact piece including a pair of movable contacts, the pair of movable contacts configured to contact the first fixed contact and the second fixed contact;

a movable member to which the movable contact piece is fixed, the movable member being movable in a contact direction in which the first fixed contact and the second fixed contact come into contact with the pair of movable contacts and in a separation direction in which the first fixed contact and the second fixed contact are separated from the pair of movable contacts; and a return spring disposed between the base and the movable member, the return spring configured to urge the movable member in the separation direction, wherein the base includes a guide portion to guide movement of the movable member, the movable member includes a sliding portion slidable with respect to the guide portion, the return spring is disposed inside the guide portion, the guide portion is disposed in the contact direction with respect to the first fixed contact and the second fixed contact, the movable member is composed of at least two components including a first component and a second component, and the movable contact piece is fixed to the movable member in a state in which the movable contact piece is sandwiched between the first component and the second component.

12. The electromagnetic relay according to claim 11, further comprising:

an elastic member disposed between the first component and the movable contact piece or between the second component and the movable contact piece, wherein the movable contact piece is fixed to the movable member via the elastic member.

13. The electromagnetic relay according to claim 11, wherein the first component and the second component are formed of different materials.

14. The electromagnetic relay according to claim 13, wherein the first component is formed of an insulating material, and the second component is formed of a metal material, the second component disposed in the contact direction with respect to the first component.

* * * * *